US011291251B2

(12) United States Patent
Qiu

(10) Patent No.: US 11,291,251 B2
(45) Date of Patent: Apr. 5, 2022

(54) ELECTRONIC CIGARETTE AND CONTROL METHOD THEREFOR

(71) Applicant: CHANGZHOU JWEI INTELLIGENT TECHNOLOGY CO., LTD., Changzhou (CN)

(72) Inventor: Weihua Qiu, Changzhou (CN)

(73) Assignee: CHANGZHOU JWEI INTELLIGENT TECHNOLOGY CO., LTD., Changzhou (CN)

(*) Notice: Subject to any disclaimer, the term of this patent is extended or adjusted under 35 U.S.C. 154(b) by 627 days.

(21) Appl. No.: 16/334,740

(22) PCT Filed: Sep. 1, 2017

(86) PCT No.: PCT/CN2017/100282
§ 371 (c)(1),
(2) Date: Mar. 19, 2019

(87) PCT Pub. No.: WO2018/049994
PCT Pub. Date: Mar. 22, 2018

(65) Prior Publication Data
US 2019/0387792 A1 Dec. 26, 2019

(30) Foreign Application Priority Data

Sep. 19, 2016 (CN) .......................... 201610832289.2

(51) Int. Cl.
*A24F 47/00* (2020.01)
*A24F 40/53* (2020.01)
(Continued)

(52) U.S. Cl.
CPC .............. *A24F 40/53* (2020.01); *A24F 40/60* (2020.01); *G05B 19/042* (2013.01);
(Continued)

(58) Field of Classification Search
CPC ..................................................... A24F 47/008
See application file for complete search history.

(56) References Cited

U.S. PATENT DOCUMENTS

2016/0106936 A1  4/2016  Kimmel
2016/0255878 A1* 9/2016  Huang .................. A24F 40/485
(Continued)

FOREIGN PATENT DOCUMENTS

CN    102496251 A    6/2012
CN    103704886 A    4/2014
(Continued)

*Primary Examiner* — Nathaniel Herzfeld
(74) *Attorney, Agent, or Firm* — Cheng-Ju Chiang

(57) ABSTRACT

An electronic cigarette includes a microprocessor, a battery module and a heating element. The battery module is electrically connected to the heating element and supplies power to the heating element with a first output parameter. The electronic cigarette further includes a sensing module, connected to the microprocessor and disposed in a smoke outlet passage of the electronic cigarette, for detecting the concentration of an analyte and sending it to the microprocessor. The microprocessor stores a preset threshold, the microprocessor receives the concentration of the analyte detected by the sensing module, and further determines the relationship between the concentration of the analyte and the preset threshold. When the concentration of the analyte is higher than or equal to the preset threshold, the microprocessor controls the battery module to supply power to the heating element with a second output parameter, wherein the second output parameter is smaller than the first output parameter.

12 Claims, 5 Drawing Sheets

(51) Int. Cl.
*G05B 19/042* (2006.01)
*H05B 1/02* (2006.01)
*A24F 40/60* (2020.01)
*A24F 40/10* (2020.01)

(52) U.S. Cl.
CPC ............ H05B 1/0297 (2013.01); *A24F 40/10* (2020.01); *G05B 2219/25252* (2013.01)

(56) References Cited

U.S. PATENT DOCUMENTS

| | | | | |
|---|---|---|---|---|
| 2017/0095000 | A1* | 4/2017 | Spirito | A24F 40/70 |
| 2017/0099878 | A1* | 4/2017 | Murison | B65B 3/04 |
| 2018/0146708 | A1* | 5/2018 | Batista | A24F 40/53 |
| 2019/0142067 | A1* | 5/2019 | Martzel | A61M 11/042 |
| | | | | 131/329 |

FOREIGN PATENT DOCUMENTS

| | | |
|---|---|---|
| CN | 204070558 U | 1/2015 |
| CN | 104770897 A | 7/2015 |
| CN | 204444248 U | 7/2015 |
| CN | 204599337 U | 9/2015 |
| CN | 204670379 U | 9/2015 |
| CN | 204682529 U | 10/2015 |
| CN | 105249539 A | 1/2016 |
| CN | 205180374 U | 4/2016 |
| CN | 205321204 U | 6/2016 |
| CN | 106820266 A | 6/2017 |

* cited by examiner

ELECTRONIC CIGARETTE AND CONTROL METHOD THEREFOR

CROSS REFERENCE TO RELATED APPLICATION

This application is a 35 U.S.C. § 371 National Phase conversion of International (PCT) Patent Application No. PCT/CN2017/100282, filed on Sep. 1, 2017, which claims the priority of Chinese Patent Application No. 201610832289.2, filed on Sep. 19, 2016. The contents of the above-identified applications are incorporated herein by reference. The PCT International Patent Application was filed and published in Chinese.

TECHNICAL FIELD

The present invention relates to the technical field of simulated smoking technology, and more particularly to an electronic cigarette and a control method therefor.

BACKGROUND

At present, electronic cigarettes on the market are heated by a power-driven atomizer, so that an aerosol-forming substrate (such as, tobacco, cigarette paste, cigarette liquid, etc.) forms smoke similar to a tobacco cigarette.

However, in the use of electronic cigarettes, if the heating temperature is too high, the aerosol-forming substrate (such as, tobacco, cigarette paste, cigarette liquid, etc.) in the electronic cigarettes may release undesired products, such as fine particles, smoke tar, carbon monoxide, etc., which are harmful to the human body. That is, if the user does not pay attention to the heating temperature when using the electronic cigarettes, the above undesired products may be inhaled, which may cause harm to the human body.

SUMMARY

In view of above, it is necessary to provide an electronic cigarette and a control method therefor, to solve the above problem.

In one aspect, the present invention provides an electronic cigarette including a microprocessor, a battery module and a heating element. The microprocessor is electrically connected to the battery module. The battery module is electrically connected to the heating element and supplies power to the heating element with a first output parameter. The electronic cigarette further includes:

a sensing module, connected to the microprocessor and disposed in a smoke outlet passage of the electronic cigarette, for detecting the concentration of an analyte and sending the concentration of the analyte to the microprocessor;

wherein the microprocessor stores a preset threshold, the microprocessor is configured to receive the concentration of the analyte detected by the sensing module, and further configured to determine the relationship between the concentration of the analyte and the preset threshold;

when the concentration of the analyte is higher than or equal to the preset threshold, the microprocessor controls the battery module to supply power to the heating element with a second output parameter, wherein the second output parameter is smaller than the first output parameter.

Optionally, the electronic cigarette further includes a reminder device electrically connected to the microprocessor, the microprocessor is further configured to control the reminder device to issue an alarm when the concentration of the analyte is higher than or equal to the preset threshold.

Optionally, when the concentration of the analyte is lower than the preset threshold, the microprocessor controls the battery module to continue to supply power to the heating element with the first output parameter.

Optionally, the electronic cigarette further includes a timer, wherein:

the timer is configured for calculating time T1 and sending T1 to the microprocessor, wherein T1 is the time during which the battery module supplies power to the heating element with the first output parameter;

the microprocessor stores a first preset time, the microprocessor is further configured to control the sensing module to detect the concentration of the analyte when T1 reaches the first preset time.

Optionally, the electronic cigarette further includes a timer, wherein:

the timer is configured for calculating time T2 and sending T2 to the microprocessor, wherein T2 is the time during which the battery module supplies power to the heating element with the second output parameter;

the microprocessor stores a second preset time, the microprocessor is further configured to control the sensing module to detect the concentration of the analyte when T2 reaches the second preset time.

Optionally, the analyte includes one or more of fine particles, smoke tar, carbon monoxide, nicotine, formaldehyde, acetaldehyde, acrolein, and glyoxal.

Optionally, the sensing module includes one or more of a PM2.5 sensor, a tar sensor, a carbon monoxide sensor, a semiconductor sensor, and an electrochemical sensor.

In another aspect, the present invention provides a control method for an electronic cigarette. The electronic cigarette includes a microprocessor, a battery module, a heating element and a sensing module. The microprocessor stores a preset threshold. The sensing module is disposed in a smoke outlet passage of the electronic cigarette. The control method includes:

the microprocessor controlling the battery module to supply power to the heating element with a first output parameter;

the sensing module detecting the concentration of an analyte in the smoke outlet passage and sending the concentration of the analyte to the microprocessor;

the microprocessor receiving the concentration of the analyte detected by the sensing module and determining the relationship between the concentration of the analyte and the preset threshold;

when the concentration of the analyte is higher than or equal to the preset threshold, the microprocessor controlling the battery module of the electronic cigarette to supply power to the heating element of the electronic cigarette with a second output parameter, wherein the second output parameter is smaller than the first output parameter.

Optionally, the electronic cigarette further includes a reminder device, the method further includes:

when the concentration of the analyte is higher than or equal to the preset threshold, the microprocessor further controlling the reminder device of the electronic cigarette to issue an alarm.

Optionally, the method further includes:

when the concentration of the analyte is lower than the preset threshold, returning back to the step of the microprocessor controlling the battery module to supply power to the heating element with a first output parameter.

Optionally, the electronic cigarette further includes a timer, the microprocessor further stores a first preset time, the method further includes:

before the step of the sensing module detecting the concentration of an analyte in the smoke outlet passage and sending the concentration of the analyte to the microprocessor, performing the following steps:

the microprocessor determining whether time T1 reaches the first preset time;

when T1 reaches the first preset time, performing the step of the sensing module detecting the concentration of an analyte in the smoke outlet passage and sending the concentration of the analyte to the microprocessor;

when T1 does not reach the first preset time, returning back to the step of the microprocessor controlling the battery module to supply power to the heating element with a first output parameter;

wherein T1 is the time calculated by the timer during which the battery module supplies power to the heating element with the first output parameter.

Optionally, the microprocessor further stores a second preset time, the method further includes:

after the step of the microprocessor controlling the battery module of the electronic cigarette to supply power to the heating element of the electronic cigarette with a second output parameter, further comprising the following steps:

the microprocessor determining whether time T2 reaches the second preset time;

when T2 reaches the second preset time, returning back to the step of the sensing module detecting the concentration of an analyte in the smoke outlet passage and sending the concentration of the analyte to the microprocessor;

when T2 does not reach the second preset time, returning back to the step of the microprocessor controlling the battery module of the electronic cigarette to supply power to the heating element of the electronic cigarette with a second output parameter;

wherein T2 is the time calculated by the timer during which the battery module supplies power to the heating element with the second output parameter.

Compared with the prior art, the electronic cigarette and the control method therefor provided by the invention can use the sensing module disposed in the smoke outlet passage of the electronic cigarette to detect the concentration of the analyte, and the output voltage/power of the battery module is controlled according to the concentration of the analyte, to realize adjustment of temperature of the heating element and effectively control the concentration of the analyte, to avoid harm to human body caused by undesired products due to the concentration of the analyte being too high.

REFERENCE SIGNS

| | |
|---|---|
| electronic cigarette | 100、200 |
| housing | 10 |
| mouthpiece | 20 |
| microprocessor | 101, 201 |
| battery module | 102, 202 |
| heating element | 103, 203 |
| liquid inlet hole | 104 |
| liquid storage chamber | 105 |
| air intake hole | 106 |
| air inlet passage | 107 |
| smoke outlet passage | 108 |
| sensing module | 109, 204 |
| smoke outlet hole | 110 |
| speaker | 205 |
| timer | 206 |
| step | S501~S504, S701~S706 |

DETAILED DESCRIPTION OF PREFERRED EMBODIMENTS

The present invention will be further described in detail below with reference to accompanying drawings and embodiments. It is understood that the specific embodiments described herein are merely illustrative of the invention and are not intended to limit the invention. All other embodiments obtained by a person of ordinary skill in the art based on the embodiments of the present invention without creative efforts are within the scope of the present invention.

It should be noted that the descriptions relating to "first", "second" and the like in the present invention are used for descriptive purposes only, and are not to be construed as indicating or implying their relative importance or implicitly indicating the number of indicated technical features. Thus, features defining "first" and "second" may include at least one of the features, either explicitly or implicitly. In addition, the technical solutions between the various embodiments may be combined with each other, but must be based on the realization of those skilled in the art, and when the combination of the technical solutions is contradictory or impossible to implement, it should be considered that the combination of the technical solutions does not exist and it is also not within the scope of protection required by the present invention.

First Embodiment

Figure 1:
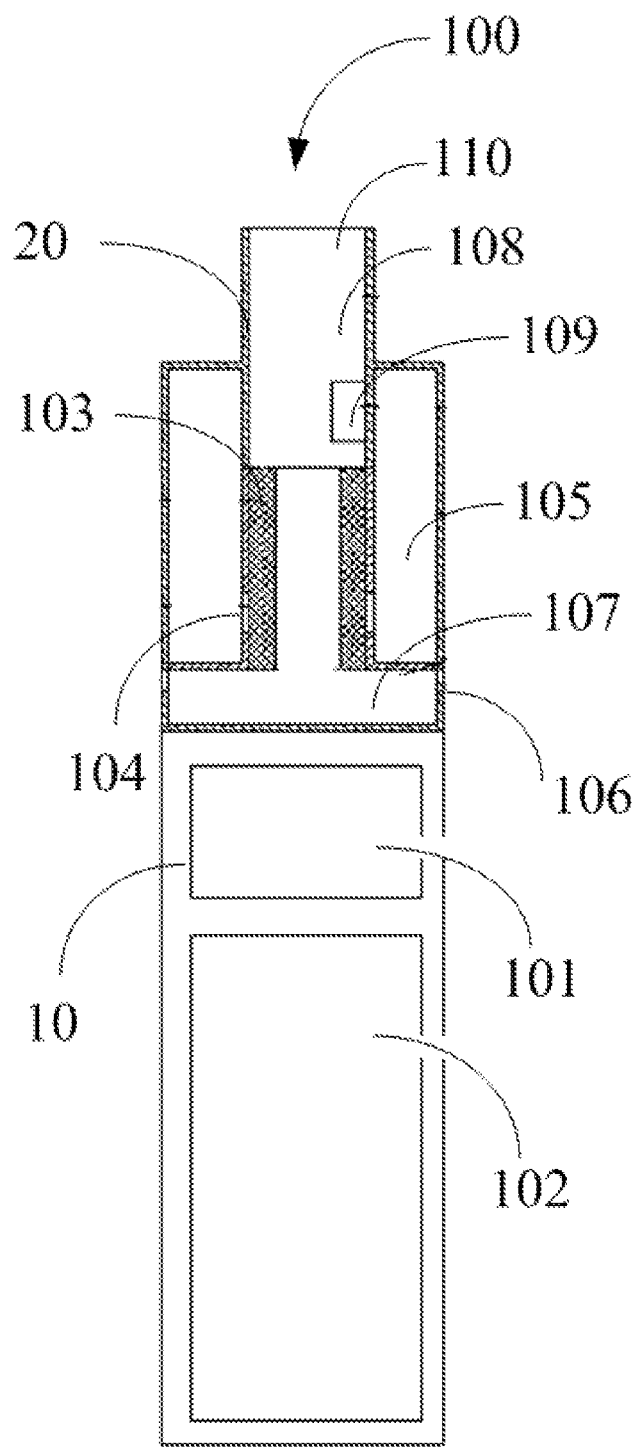
FIG. 1 is a schematic structural diagram of an electronic cigarette according to a first embodiment of the present invention.

Referring to FIG. 1, a structural diagram of an electronic cigarette 100 according to a first embodiment of the present invention is shown. The electronic cigarette 100 includes a housing 10, a mouthpiece 20 disposed at one end of the housing 10, a battery module 102 received in the housing 10, a heating element 103 received in the housing 10, a sensing module 109 fixed in the mouthpiece 20, and a microprocessor 101 received in the housing 10 and electrically connected to the battery module 102. Since the sensing module 109 is fixedly disposed in the mouthpiece 20, when the sensing module 109 is damaged, it can be replaced together with the mouthpiece 20, which is convenient and quick.

An air intake hole 106 is defined through the housing 10, and an air inlet passage 107 is defined in the housing 10. The air inlet passage 107 communicates with the air intake hole 106 and the mouthpiece 20. A liquid storage chamber 105 is provided in the housing 10, and an outer wall of the mouthpiece 20 is fixedly coupled to an inner wall of the liquid storage chamber 105. The inner wall of the liquid storage chamber 105 is provided with at least a liquid inlet hole 104, and the heating element 103 is disposed at a position corresponding to the liquid inlet hole 104 on the inner wall of the liquid storage chamber 105.

The mouthpiece 20 is disposed at one end of the housing 10 and communicates with the air inlet passage 107. The mouthpiece 20 is provided with a smoke outlet hole 110 at one end of the mouthpiece 20 opposite to the housing 10. The external air can enter the air inlet passage 107 through the air intake hole 106, thereby flowing into the mouthpiece 20 through the air inlet passage 107.

The liquid storage chamber 105 is used for storage of cigarette liquid, and the external air flows into the air inlet passage 107 from the air inlet hole 106, and the heating element 103 heats the cigarette liquid flowing in from the liquid inlet hole 104 to generate smoke. A smoke outlet passage 108 is defined in the mouthpiece 20. The heating element 103 is a hollow heater pipe having openings at both ends, one end of the heating element 103 communicates with the smoke outlet passage 108, and the other end of the heating element 103 communicates with the air inlet passage 107. The external air flows in through the air intake hole 106 and the air inlet passage 107, and is mixed with the generated smoke to flow out through the smoke outlet passage 108 and the smoke outlet hole 110.

It is to be understood that, in other embodiments, the heating element 103 may also be a heating sheet, a heating wire, or a heating rod, etc., so long as the heating element 103 is connected with one end of the air inlet passage 107 opposite to the air inlet hole 106, and the heating element 103 is connected with one end of the smoke outlet passage 108 opposite to the smoke outlet hole 110.

It can be understood that, in other embodiments, a connecting member may be provided between the mouthpiece 20 and the heating element 103, so that the layout of the various components in the electronic cigarette 100 can be more flexible. In such case, an inner chamber of the mouthpiece 20 and an inner chamber of the connecting member together form the smoke outlet passage 108.

The microprocessor 101 is electrically connected to the battery module 102, and the microprocessor 101 is in signal connection with the sensing module 109. The microprocessor 101 is configured to receive the concentration of an analyte detected by the sensing module 109, to determine the relationship between the concentration of the analyte and a preset threshold, and finally, to control the operation of the battery module 102 according to the determination result.

The battery module 102 is electrically connected to the heating element 103 for supplying power to the heating element 103 with different output parameters under the control of the microprocessor 101. It should be noted that, under normal circumstances, the battery module 102 supplies power to the heating element 103 with a first output parameter. The output parameter herein refers to an output voltage or power of the battery module 102 supplied to the heating element 103.

The sensing module 109 is fixedly disposed in the smoke outlet passage 108, for detecting the concentration of the analyte in the smoke outlet passage 108, and sending the detected concentration of the analyte to the microprocessor 101. It is understood that, when the heating temperature of the heating element 103 is high, the concentration of the analyte may be high. Optionally, the analyte includes one or more of fine particles, smoke tar, carbon monoxide, nicotine, formaldehyde, acetaldehyde, acrolein, and glyoxal. Correspondingly, the sensing module 109 includes one or more of a PM2.5 sensor, a tar sensor, a carbon monoxide sensor, a semiconductor sensor, and an electrochemical sensor.

The microprocessor 101 stores a preset threshold. The microprocessor 101 is configured to receive the concentration of the analyte detected by the sensing module 109, and further configured to determine the relationship between the concentration of the analyte and the preset threshold. If the concentration of the analyte is higher than or equal to (i.e., ≥) the preset threshold, the microprocessor 101 controls the battery module 102 to supply power to the heating element 103 with a second output parameter, wherein the second output parameter is smaller than the first output parameter. It can be understood that, when the second output parameter is equal to zero, the microprocessor 101 controls the battery module 102 to stop supplying power to the heating element 103. Optionally, in this embodiment, if the concentration of the analyte is lower than the preset threshold, the microprocessor 101 controls the battery module 103 to continue to supply power to the heating element 103 with the first output parameter.

Optionally, in this embodiment, after the battery module 102 is controlled to supply power to the heating element 103 with the second output parameter for a second preset time, or the battery module 103 is controlled to supply power to the heating element 103 with the first output parameter for a first preset time, the sensing module 109 detects the concentration of the analyte again and sends it to the microprocessor 101, the microprocessor 101 further receives the concentration of the analyte and determines the relationship between the concentration of the analyte and the preset threshold, and finally, the operation of the battery module 102 is controlled according to the determination result. The first preset time and the second preset time may be the same or different, which can be specifically set according to the actual situation of the electronic cigarette.

It should be noted that, in the first embodiment, the electronic cigarette 100 is not limited to liquid type electronic cigarette, and may be a tobacco or a paste type electronic cigarette. The first embodiment of the present invention is described with reference to the liquid type electronic cigarette as an example, but is not limited thereto.

In this way, the electronic cigarette 100 in the first embodiment of the present invention can adjust the output parameter of the battery module 102 according to the relationship between the concentration of the analyte in the smoke outlet passage 108 and the preset threshold, thereby realizing adjustment of the heating temperature of the heating element 103 and effectively controlling the concentration of the analyte, to avoid harm to the human body caused by the excessively high concentration of the analyte.

Second Embodiment

Figure 2:
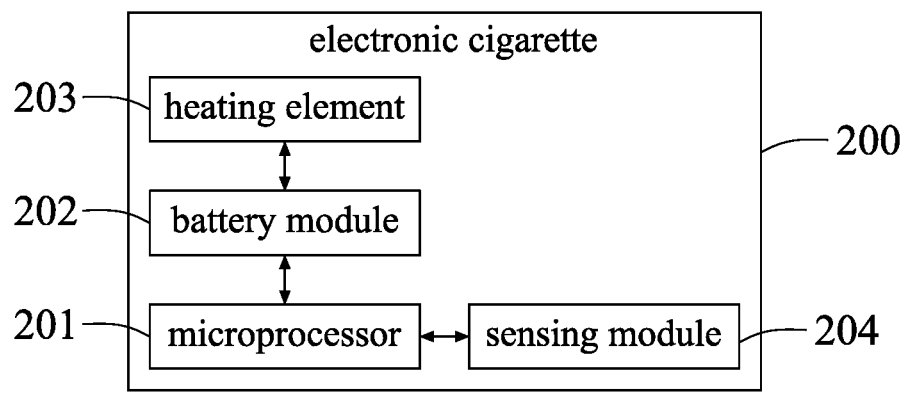
FIG. 2 is a schematic block diagram of functional modules of a first electronic cigarette according to a second embodiment of the present invention.

FIG. 2 is a schematic diagram of functional modules of an electronic cigarette 200 according to a second embodiment of the present invention. As shown in FIG. 2, the electronic cigarette 200 includes a microprocessor 201, a battery module 202, a heating element 203, and a sensing module 204.

The microprocessor 201 is electrically connected to the battery module 202, and the microprocessor 201 is in signal connection with the sensing module 204. The microprocessor 201 stores a preset threshold. The microprocessor 201 is configured to receive the concentration of the analyte detected by the sensing module 204, to determine the relationship between the concentration of the analyte and the preset threshold, and finally, to control the operation of the battery module 202 according to the determination result. The battery module 202 is electrically connected to the heating element 203 and supplies power to the heating element 203 with a first output parameter under normal circumstances.

The sensing module 204 is disposed in the smoke outlet passage of the electronic cigarette 200, for detecting the concentration of the analyte. Optionally, the analyte includes one or more of fine particles, smoke tar, carbon monoxide, nicotine, formaldehyde, acetaldehyde, acrolein, and glyoxal. Correspondingly, the sensing module 204 includes one or more of a PM2.5 sensor, a tar sensor, a carbon monoxide sensor, a semiconductor sensor, and an electrochemical sensor.

The microprocessor 201 is configured to receive the concentration of the analyte detected by the sensing module 204, and further configured to determine the relationship between the concentration of the analyte and the preset threshold. When the concentration of the analyte is higher than or equal to (i.e., ≥) the preset threshold, the microprocessor 201 controls the battery module 202 to supply power to the heating element 203 with a second output parameter which is smaller than the first output parameter, thereby realizing control of the heating temperature of the heating element 203 and preventing excessively high concentration of the analyte due to excessively high temperature to cause harm to the user's body. In this way, the electronic cigarette 200 in the second embodiment of the present invention can adjust the output parameter of the battery module 202 according to the relationship between the concentration of the analyte in the smoke outlet passage and the preset threshold, thereby achieving adjustment of the heating temperature of the heating element 203, to effectively control the concentration of the analyte and to avoid harm to the human body caused by the excessively high concentration of the analyte.

Optionally, in this embodiment, if the concentration of the analyte is lower than the preset threshold, the microprocessor 201 controls the battery module 203 to continue to supply power to the heating element 203 with the first output parameter.

Figure 3:
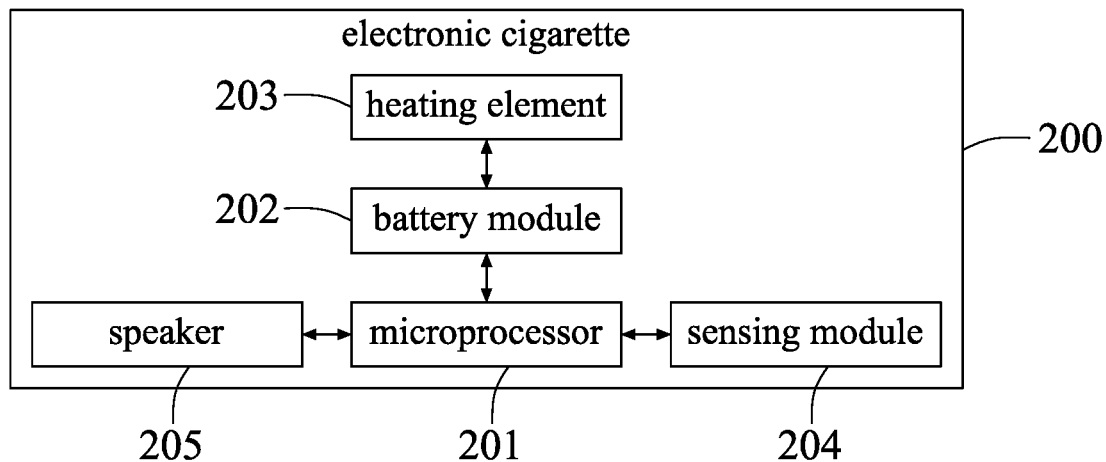
FIG. 3 is a schematic block diagram of functional modules of a second electronic cigarette according to the second embodiment of the present invention.

Optionally, as shown in FIG. 3, it is a schematic diagram of functional modules of another electronic cigarette 200 according to the second embodiment of the present invention. As shown in FIG. 3, the electronic cigarette 200 further includes a speaker 205. When the concentration of the analyte is higher than or equal to (i.e., ≥) the preset threshold, the microprocessor 201 controls the speaker 205 to issue an alarm, to remind the user that the concentration of the analyte is too high, which may cause harm to the human body.

It can be understood that, in other embodiments, other reminder devices may be used, such as a display device, a warning light or a vibration device instead of the speaker, to remind the user that the concentration of the analyte is too high, or a combination of the reminder devices such as a speaker 205, a display device, a warning light or a vibration device may be used.

Figure 4:
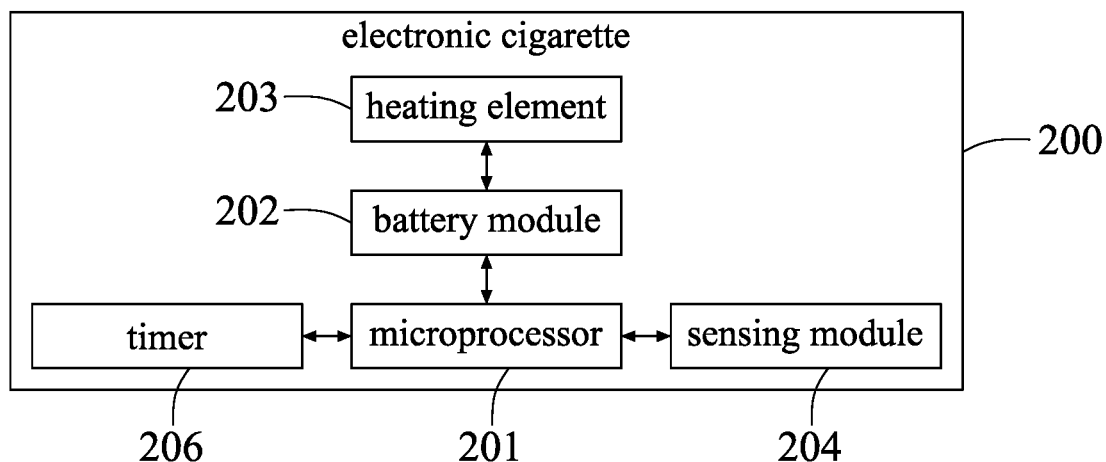
FIG. 4 is a schematic block diagram of functional modules of a third electronic cigarette according to the second embodiment of the present invention.

Optionally, as shown in FIG. 4, it is a schematic diagram of functional modules of another electronic cigarette 200 according to the second embodiment of the present invention. As shown in FIG. 4, the electronic cigarette 200 further includes a timer 206 for calculating time T1 during which the battery module 202 supplies power to the heating element 203 with the first output parameter. The timer 206 is further configured to calculate time T2 during which the battery module 202 supplies power to the heating element 203 with the second output parameter. The timer 206 feeds the calculated time T1, T2 back to the microprocessor 201. In this embodiment, the microprocessor 201 stores a first preset time and a second preset time. When T1 reaches the first preset time or T2 reaches the second preset time, the microprocessor 201 controls the sensing module 204 to detect the concentration of the analyte again, the microprocessor 201 then determines the relationship between the concentration of the analyte and the preset threshold when receiving the concentration of the analyte again, and finally, controls the operation of the battery module 202 according to the determination result. The first preset time and the second preset time may be the same or different, which can be specifically set according to the actual situation of the electronic cigarette.

Third Embodiment

Figure 5:
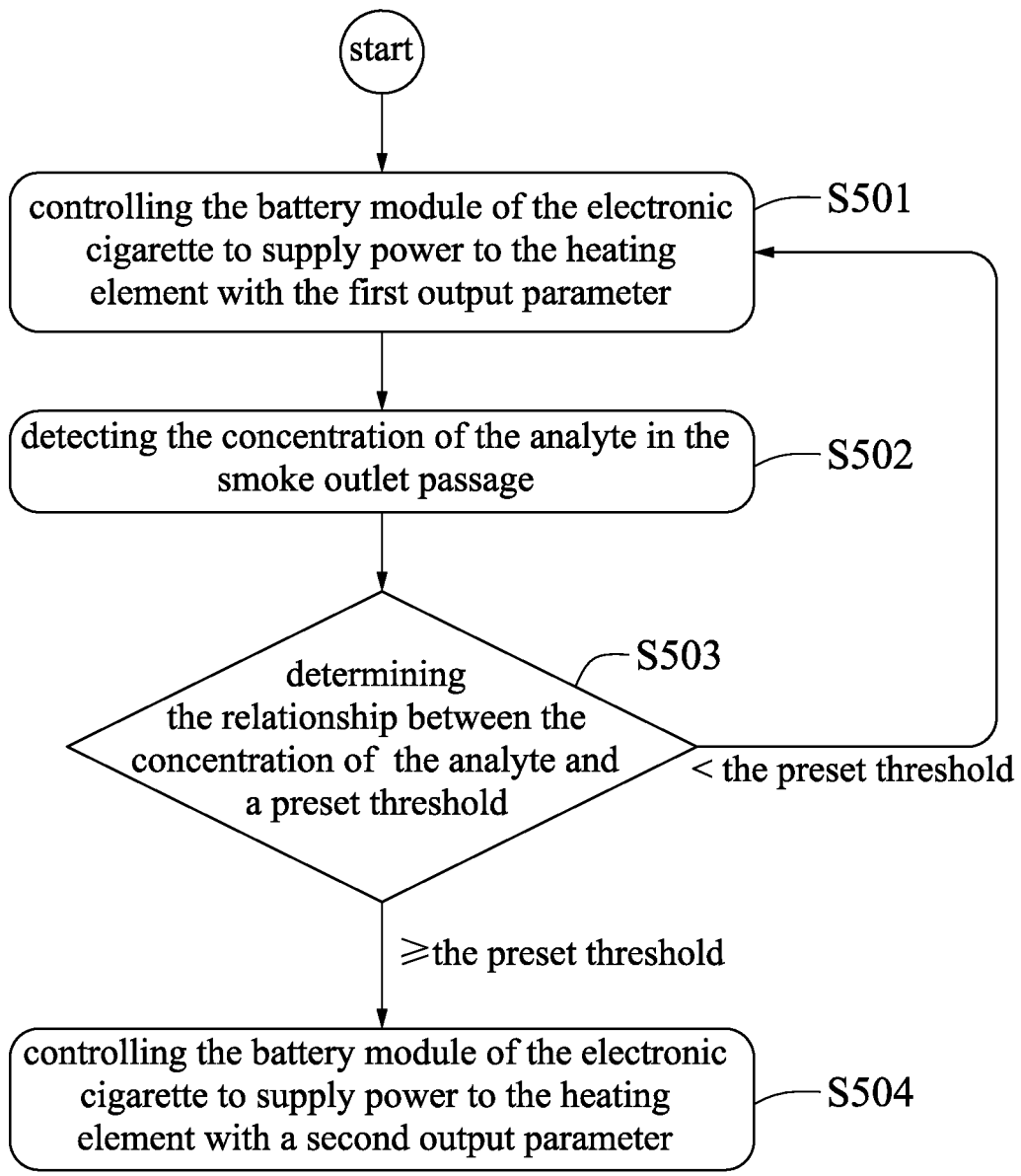
FIG. 5 is a flow chart of steps of a control method for an electronic cigarette according to a third embodiment of the present invention.

FIG. 5 is a flow chart of steps of a control method for an electronic cigarette according to a third embodiment of the present invention. As shown in FIG. 5, the method includes:

Step S501, the microprocessor controls the battery module of the electronic cigarette to supply power to the heating element with the first output parameter.

In the third embodiment, the control method can be operated in the electronic cigarette according to the first embodiment or in the electronic cigarette according to the second embodiment, and under normal circumstances in use, the method controls the battery module of the electronic cigarette to supply power to the heating element with the first output parameter.

Step S502, the sensing module detects the concentration of the analyte in the smoke outlet passage of the electronic cigarette, and sends the concentration of the analyte to the microprocessor.

Optionally, the analyte includes one or more of fine particles, smoke tar, carbon monoxide, nicotine, formaldehyde, acetaldehyde, acrolein, and glyoxal.

Correspondingly, the sensing module includes one or more of a PM2.5 sensor, a tar sensor, a carbon monoxide sensor, a semiconductor sensor, and an electrochemical sensor.

Step S503, the microprocessor receives the concentration of the analyte detected by the sensing module, and determines the relationship between the concentration of the analyte and a preset threshold.

In this step, if the concentration of the analyte is higher than or equal to (i.e., ≥) the preset threshold, step S504 is performed; conversely, if the concentration of the analyte is lower than (i.e., <) the preset threshold, the flow returns to step S501.

Step S504, the microprocessor controls the battery module of the electronic cigarette to supply power to the heating element with a second output parameter.

In the step S504, the second output parameter is smaller than the first output parameter. Thus, the control method provided by the third embodiment of the present invention can reduce the heating temperature of the heating element when the concentration of the analyte exceeds the preset threshold, thereby preventing the concentration of the analyte from being excessively high due to excessively high temperature to cause harm to the user's body.

Figure 6:
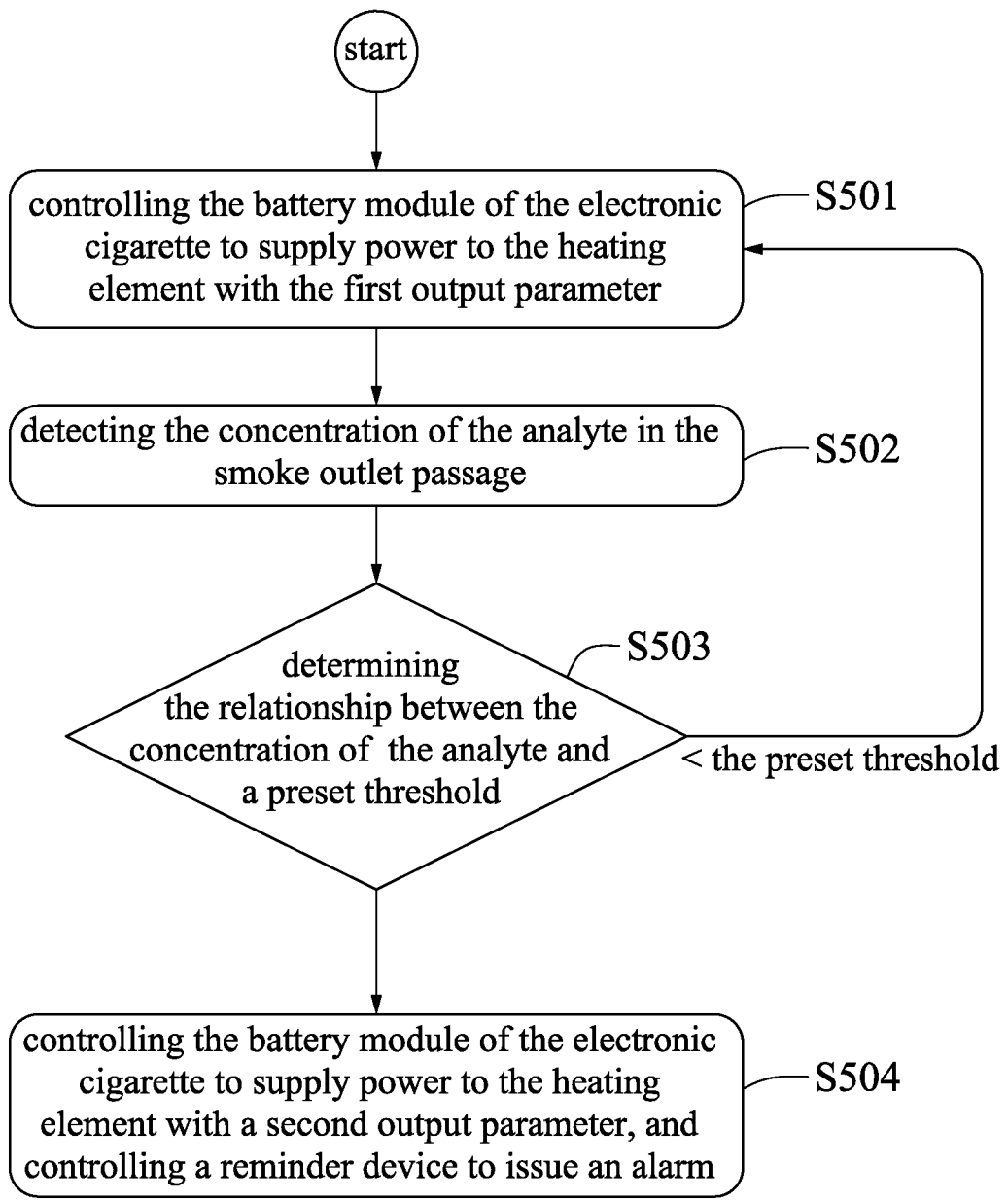
FIG. 6 is a flow chart of steps of another control method for an electronic cigarette according to the third embodiment of the present invention.

Optionally, referring to FIG. 6, FIG. 6 is a flow chart of another control method for an electronic cigarette according to an embodiment of the present invention. As shown in FIG. 6, the step S504 may further include controlling a reminder device on the electronic cigarette to issue an alarm, in order to remind the user that the concentration of the analyte is too high, which may cause harm to the human body.

The reminder device is at least one of a speaker, a display device, a warning light and a vibration device.

Thus, through the above steps, the control method for an electronic cigarette according to the third embodiment of the present invention can adjust the output power of the battery module according to the concentration of the analyte in the smoke outlet passage, thereby realizing adjustment of the heating temperature of the heating element. Therefore, the concentration of the analyte can be effectively controlled to avoid harm to the human body due to the excessively high concentration of the analyte.

Fourth Embodiment

Figure 7:
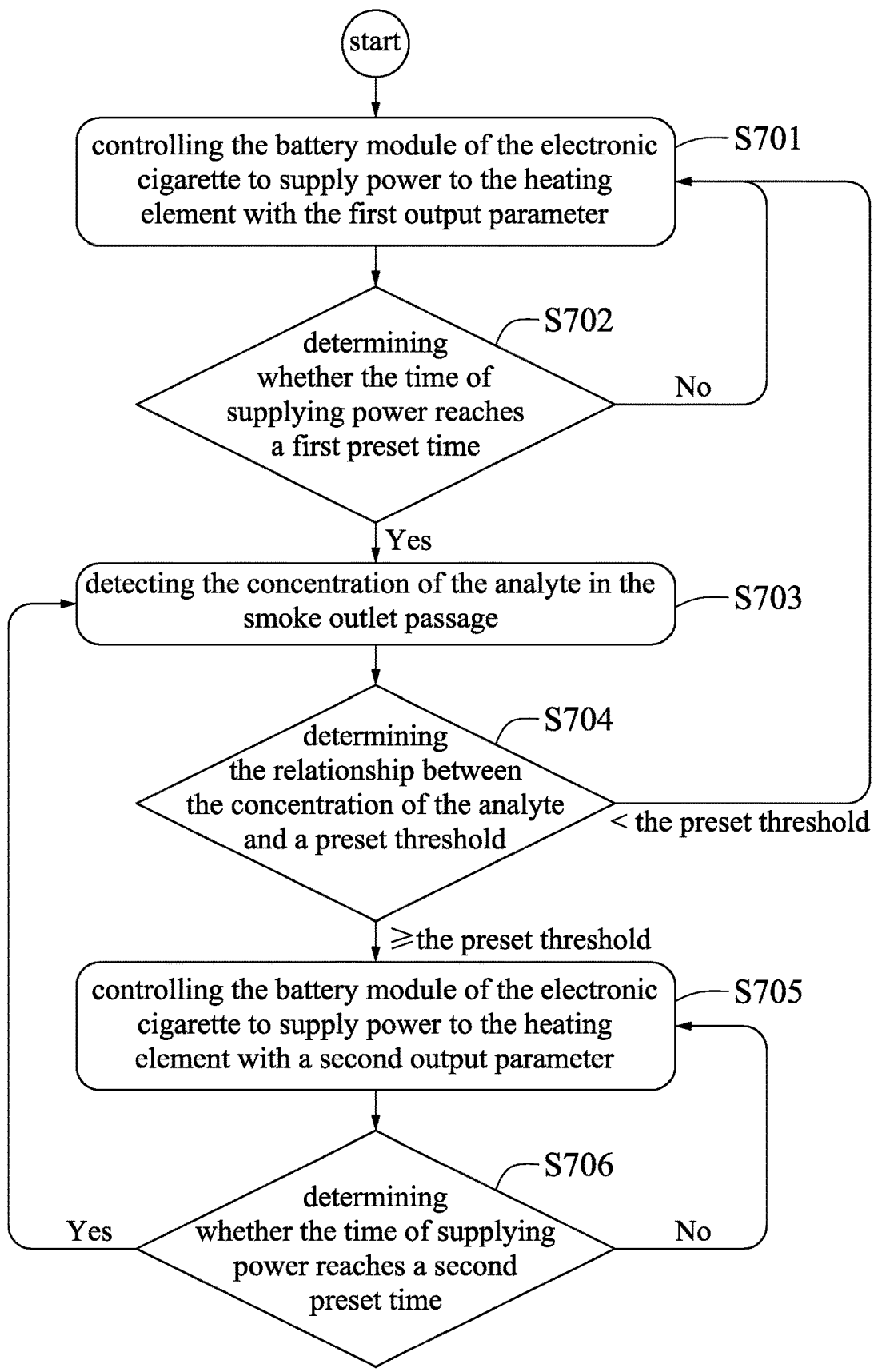
FIG. 7 is a flow chart of steps of a control method for an electronic cigarette according to a fourth embodiment of the present invention.

FIG. 7 is a flow chart of steps of a control method for an electronic cigarette according to a fourth embodiment of the present invention. As shown in FIG. 7, the method includes:

Step S701, the microprocessor controls the battery module of the electronic cigarette to supply power to the heating element with the first output parameter.

This step S701 is the same as step S501 in the third embodiment, and details are not described herein again.

Step S702, the microprocessor determines whether the time during which the battery module supplies power to the heating element with the first output parameter reaches a first preset time.

In this step, if the time during which the battery module supplies power to the heating element with the first output parameter reaches the first preset time, step S703 is performed; conversely, if the time during which the battery module supplies power to the heating element with the first output parameter does not reach the first preset time, the flow returns to step S701.

Step S703, the sensing module detects the concentration of the analyte in the smoke outlet passage of the electronic cigarette, and sends the concentration of the analyte to the microprocessor.

Optionally, the analyte includes one or more of fine particles, smoke tar, carbon monoxide, nicotine, formaldehyde, acetaldehyde, acrolein, and glyoxal.

Correspondingly, the sensing module includes one or more of a PM2.5 sensor, a tar sensor, a carbon monoxide sensor, a semiconductor sensor, and an electrochemical sensor.

Step S704, the microprocessor receives the concentration of the analyte detected by the sensing module and determines the relationship between the concentration of the analyte and a preset threshold.

In this step, if the concentration of the analyte is higher than or equal to (i.e., ≥) the preset threshold, step S705 is performed; conversely, if the concentration of the analyte is lower than (i.e., <) the preset threshold, the flow returns to step S701.

Step S705, the microprocessor controls the battery module of the electronic cigarette to supply power to the heating element with a second output parameter.

In the step S705, the second output parameter is smaller than the first output parameter. In this way, the control method according to the fourth embodiment of the present invention can reduce the heating temperature of the heating element when the concentration of the analyte exceeds the preset threshold, thereby preventing the analyte from being excessively high due to excessively high temperature to cause harm to the user's body.

Step S706, the microprocessor determines whether the time during which the battery module supplies power to the heating element with the second output parameter reaches a second preset time.

In this step, if the time during which the battery module supplies power to the heating element with the second output parameter reaches the second preset time, the flow returns to step S703; conversely, if the time during which the battery module supplies power to the heating element with the second output parameter does not reach the second preset time, the flow returns to step S705.

Thus, through the above steps, the control method according to the fourth embodiment of the present invention can adjust the output power of the battery module according to the concentration of the analyte in the smoke outlet passage, thereby realizing adjustment of the heating temperature of the heating element. Therefore, the concentration of the analyte can be effectively controlled to avoid harm to the human body due to the excessively high concentration of the analyte.

It should be understood by those skilled in the art that the above embodiments are only intended to illustrate the invention, and are not intended to limit the invention. Variations and modifications to the above embodiments are intended to fall within the scope of the invention, as long as it is within the spirit of the invention.

What is claimed is:

1. An electronic cigarette, comprising a microprocessor, a battery module and a heating element, the microprocessor being electrically connected to the battery module, the battery module being electrically connected to the heating element and supplying power to the heating element with a first output parameter, characterized in that the electronic cigarette further comprises:

a sensing module, connected to the microprocessor and disposed in a smoke outlet passage of the electronic cigarette, for detecting the concentration of an analyte and sending the concentration of the analyte to the microprocessor;

wherein the microprocessor stores a preset threshold, the microprocessor is configured to receive the concentration of the analyte detected by the sensing module, and further configured to determine the relationship between the concentration of the analyte and the preset threshold;

when the concentration of the analyte is higher than or equal to the preset threshold, the microprocessor controls the battery module to supply power to the heating element with a second output parameter, wherein the second output parameter is smaller than the first output parameter.

2. The electronic cigarette according to claim 1, wherein the electronic cigarette further comprises a reminder device electrically connected to the microprocessor, the microprocessor is further configured to control the reminder device to issue an alarm when the concentration of the analyte is higher than or equal to the preset threshold.

3. The electronic cigarette according to claim 1, wherein when the concentration of the analyte is lower than the preset threshold, the microprocessor controls the battery module to continue to supply power to the heating element with the first output parameter.

4. The electronic cigarette according to claim 1, wherein the electronic cigarette further comprises a timer, wherein:
the timer is configured for calculating time T1 and sending T1 to the microprocessor, wherein T1 is the time during which the battery module supplies power to the heating element with the first output parameter;
the microprocessor stores a first preset time, the microprocessor is further configured to control the sensing module to detect the concentration of the analyte when T1 reaches the first preset time.

5. The electronic cigarette according to claim 1, wherein the electronic cigarette further comprises a timer, wherein:
the timer is configured for calculating time T2 and sending T2 to the microprocessor, wherein T2 is the time during which the battery module supplies power to the heating element with the second output parameter;
the microprocessor stores a second preset time, the microprocessor is further configured to control the sensing module to detect the concentration of the analyte when T2 reaches the second preset time.

6. The electronic cigarette according to claim 1, wherein the analyte comprises one or more of fine particles, smoke tar, carbon monoxide, nicotine, formaldehyde, acetaldehyde, acrolein, and glyoxal.

7. The electronic cigarette according to claim 1, wherein the sensing module comprises one or more of a PM2.5 sensor, a tar sensor, a carbon monoxide sensor, a semiconductor sensor, and an electrochemical sensor.

8. A control method for an electronic cigarette, characterized in that wherein the electronic cigarette comprises a microprocessor, a battery module, a heating element and a sensing module, the microprocessor stores a preset threshold, the sensing module is disposed in a smoke outlet passage of the electronic cigarette, the control method comprises:
the microprocessor controlling the battery module to supply power to the heating element with a first output parameter;
the sensing module detecting the concentration of an analyte in the smoke outlet passage and sending the concentration of the analyte to the microprocessor;
the microprocessor receiving the concentration of the analyte detected by the sensing module and determining the relationship between the concentration of the analyte and the preset threshold;
when the concentration of the analyte is higher than or equal to the preset threshold, the microprocessor controlling the battery module of the electronic cigarette to supply power to the heating element of the electronic cigarette with a second output parameter, wherein the second output parameter is smaller than the first output parameter.

9. The control method according to claim 8, wherein the electronic cigarette further comprises a reminder device, the method further comprises:
when the concentration of the analyte is higher than or equal to the preset threshold, the microprocessor further controlling the reminder device of the electronic cigarette to issue an alarm.

10. The control method according to claim 8, wherein the method further comprises:
when the concentration of the analyte is lower than the preset threshold, returning back to the step of the microprocessor controlling the battery module to supply power to the heating element with a first output parameter.

11. The control method according to claim 10, wherein the electronic cigarette further comprises a timer, the microprocessor further stores a first preset time, the method further comprises:
before the step of the sensing module detecting the concentration of an analyte in the smoke outlet passage and sending the concentration of the analyte to the microprocessor, performing the following steps:
the microprocessor determining whether time T1 reaches the first preset time;
when T1 reaches the first preset time, performing the step of the sensing module detecting the concentration of an analyte in the smoke outlet passage and sending the concentration of the analyte to the microprocessor;
when T1 does not reach the first preset time, returning back to the step of the microprocessor controlling the battery module to supply power to the heating element with a first output parameter;
wherein T1 is the time calculated by the timer during which the battery module supplies power to the heating element with the first output parameter.

12. The control method according to claim 11, wherein the microprocessor further stores a second preset time, the method further comprises:
after the step of the microprocessor controlling the battery module of the electronic cigarette to supply power to the heating element of the electronic cigarette with a second output parameter, further comprising the following steps:
the microprocessor determining whether time T2 reaches the second preset time;
when T2 reaches the second preset time, returning back to the step of the sensing module detecting the concentration of an analyte in the smoke outlet passage and sending the concentration of the analyte to the microprocessor;
when T2 does not reach the second preset time, returning back to the step of the microprocessor controlling the battery module of the electronic cigarette to supply power to the heating element of the electronic cigarette with a second output parameter;
wherein T2 is the time calculated by the timer during which the battery module supplies power to the heating element with the second output parameter.

* * * * *